United States Patent [19]

Lassiaz et al.

[11] Patent Number: 4,854,436
[45] Date of Patent: Aug. 8, 1989

[54] CLUTCH RELEASE BEARING

[75] Inventors: Philippe Lassiaz, Boulogne, France; Gino Villata, Buttegliera; Carlo Beccaris, Turin, both of Italy

[73] Assignee: Valeo, Paris, France

[21] Appl. No.: 139,200

[22] Filed: Dec. 29, 1987

[30] Foreign Application Priority Data

Dec. 29, 1986 [FR] France ................................ 8618294

[51] Int. Cl.⁴ .............................................. F16D 23/14
[52] U.S. Cl. ..................................... 192/98; 192/110 B
[58] Field of Search ............................. 192/98, 110 B

[56] References Cited

U.S. PATENT DOCUMENTS

| 3,604,545 | 9/1971 | Bourgeois | 192/98 |
| 3,967,710 | 7/1976 | Ernst et al. | 192/98 |
| 4,029,186 | 6/1977 | De Gennes | 192/98 |
| 4,119,187 | 10/1978 | Ernst et al. | 192/98 |
| 4,144,957 | 3/1979 | de Gennes | 192/98 |
| 4,403,685 | 9/1985 | Beccaris | 192/98 |
| 4,608,741 | 9/1986 | Mallet | 192/98 |

FOREIGN PATENT DOCUMENTS

| 0030165 | 6/1981 | European Pat. Off. |  |
| 2195297 | 3/1974 | France . |  |
| 2304829 | 10/1976 | France . |  |
| 2461158 | 1/1981 | France . |  |
| 2470898 | 6/1981 | France . |  |
| 2487024 | 1/1982 | France | 192/98 |
| 2544429 | 10/1984 | France . |  |
| 8100142 | 1/1981 | PCT Int'l Appl. . |  |
| 1441804 | 7/1976 | United Kingdom | 192/98 |
| 2052001 | 1/1981 | United Kingdom | 192/98 |

Primary Examiner—Leslie A. Braun
Assistant Examiner—David A. Testardi
Attorney, Agent, or Firm—Charles E. Brown; Charles A. Brown

[57] ABSTRACT

An improvement to clutch release bearings which comprise an operating element and a drive element retained together and controlled by axially-acting elastic members formed by a limited number of separate elastic clamps. The elastic clamps are operable to apply a radial flange of the drive element against a radial flange of the operating element. Each elastic clamp comprises an axial part and a radial part. The axial part extends across the flange of the operating element through an opening in the flange. Two axial channels are provided in association with this opening to hold this elastic clamp radially in place. The invention is particularly applicable to self-centering clutch release bearings for automobiles wherein the bearings are capable of permanent self-centering.

17 Claims, 3 Drawing Sheets

U.S. Patent    Aug. 8, 1989    Sheet 1 of 3    4,854,436
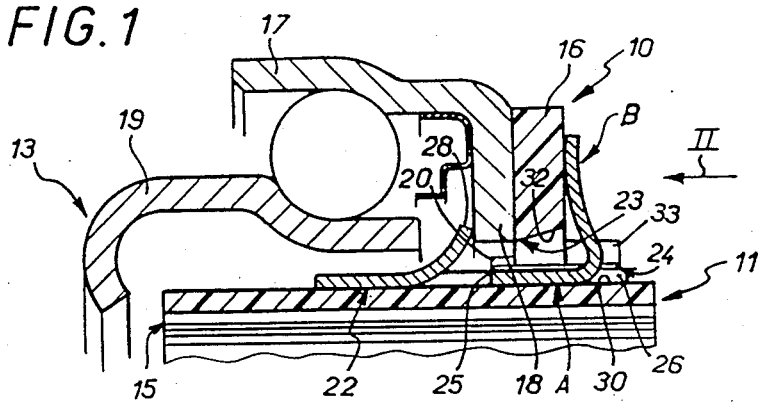
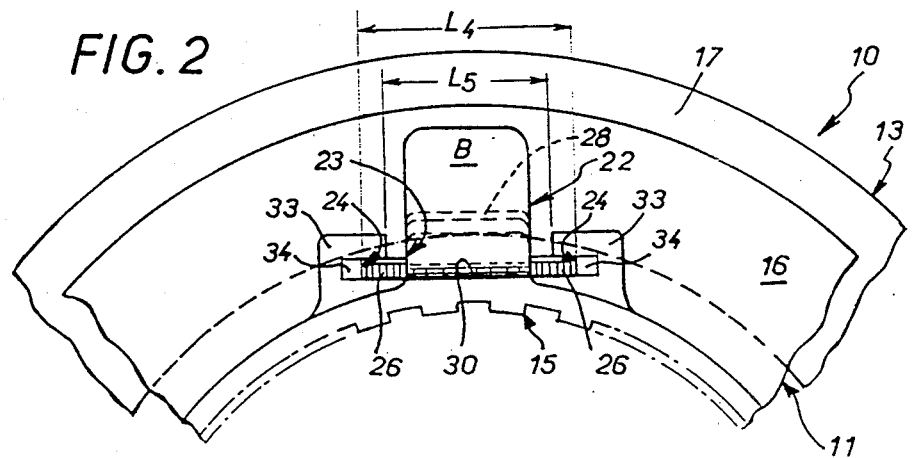
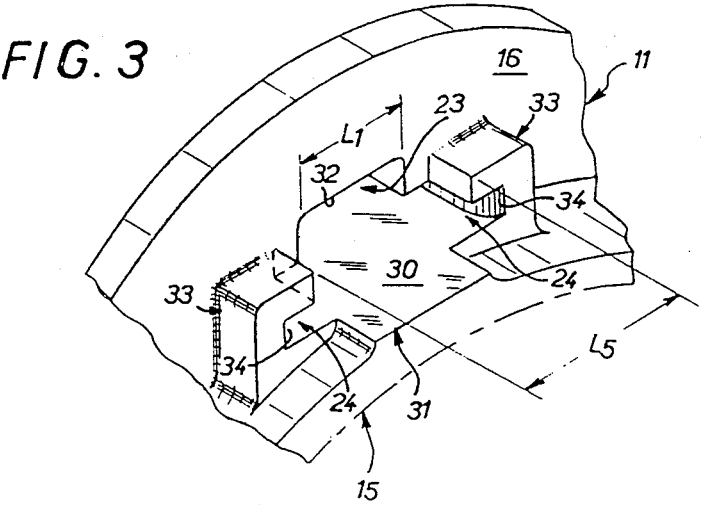

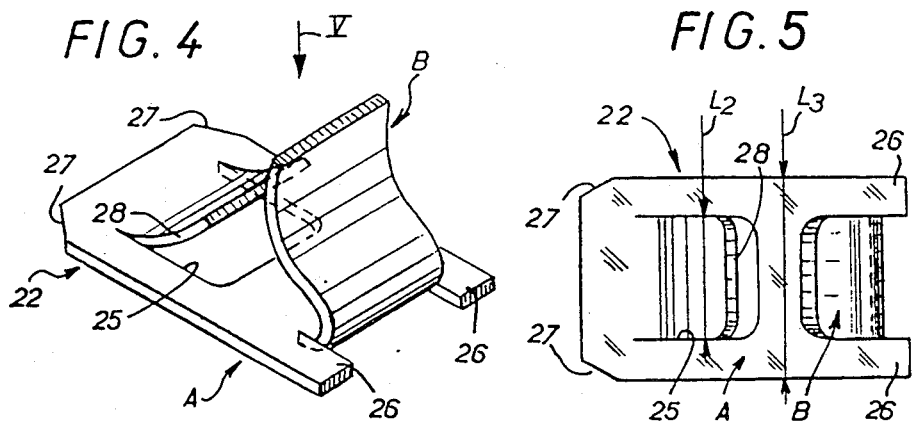
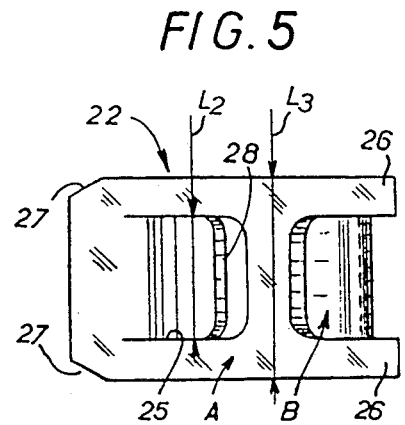
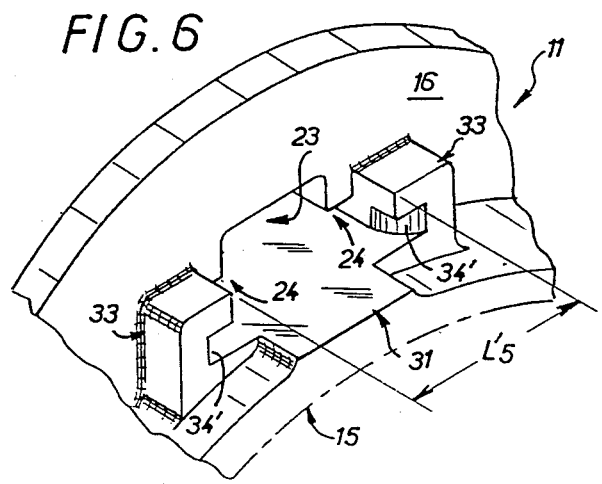
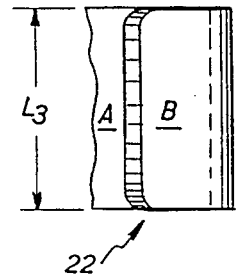
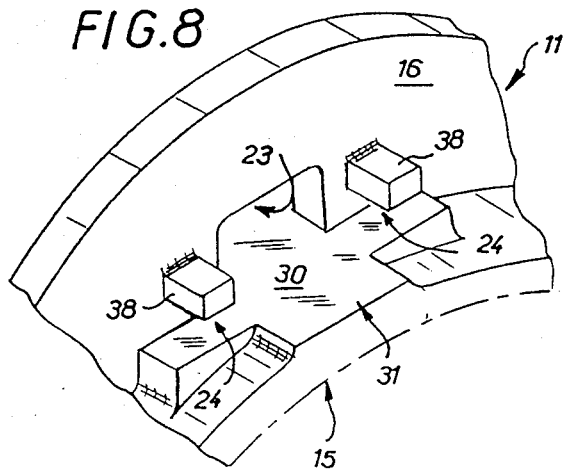
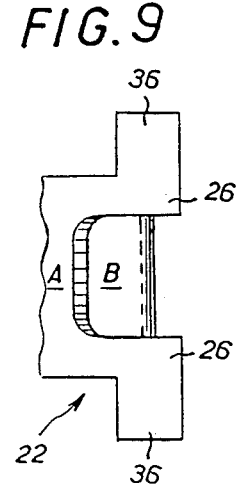

CLUTCH RELEASE BEARING

FIELD OF THE INVENTION

The present invention relates generally to clutch release bearings of the kind used for example in automobile vehicles.

Generally, such a clutch release bearing comprises an operating element, which is acted on by a control device such as a clutch fork, and a drive element which, either directly or indirectly, is retained axially in contact with the operating element and which under the action of the latter is designed to act on the declutching device of the clutch.

The present invention relates more particularly to the case in which the axial retention of the drive element relative to the operating element is by elastic means with an axial action.

This arrangement is used especially with self centering clutch release bearings with permanent self centering in which, as a result of an annular clearance provided for this purpose, the drive element gains, with respect to the operating element, within the limits of the clearance and under the precise control of the axially-acting elastic means, a freedom of movement in all directions in a plane perpendicular to the axis of the assembly.

DESCRIPTION OF THE RELATED ART

Release bearings of this kind are described in French patent No. 75 08847 (published as No. 2.304.829) and in French patent No. 79 29788 (published as No. 2.470.898).

In the prior art release bearings, elastic means with axial action are advantageously used to assure amongst other things the necessary axial connection between the drive element and the operating element.

In French patent No. 75 08847, these elastic means with an axial action consist of an annular washer, of the Belleville washer type, which is applied either by its internal or by its external periphery against either one of the elements which constitute the drive element and the operating element, and which, along the other periphery, is provided with lugs with which it grips the other of the said elements.

For example, the operating element has a transverse flange, for the axial application of the drive element, and the drive element itself has, transversely, a flanged edge, for application against the said flange, which allows particularly advantageous methods of fabrication, the annular washer being disposed between the flange and the flanged edge.

This arrangement which in particular has the advantage of allowing the parts to be installed axially in the assembly, has given and still gives satisfaction, at least in certain applications.

In other applications, the presence of a circular washer can give rise to a difficulty in that it occupies a continuous circular space which can make the necessary intervention of the control device less easy.

Furthermore, this washer must inevitably be adjusted in diameter to the release bearing with which it is used and, in practice, it is therefore most often necessary to provide a distinct washer for each type of release bearing, which leads to a corresponding plurality of fabrications.

Finally, it is not always easy to control the way in which the particular elasticity of this washer is transmitted to the elements concerned by the lugs associated with it, so that the elastic effort applied to these elements can be different or variable from one lug to another. In French patent No. 79 29788, on the other hand, the axially-acting elastic means are formed by a limited number of distinct elastic clamps acting completely independently.

In practice, these are U-shaped elastic clamps which are interposed between the flange of the operating element and flanged edge of the drive element, and are radially engaged on the flange and the flanged edge, and the only constitutive parts of which, namely the two wings, both extend radially with respect to the axis of the assembly.

Because these elastic clamps or clips are separate pieces, it is necessary to place a suitable radial restrainer on them to ensure that individually they do not escape prematurely from the elements to which they are fastened; this complicates the corresponding manufacturing process and increases the cost of the assembly.

Moreover, with regard to the U-shaped clamps, their installation must necessarily be performed radially, which itself complicates the mounting of the assembly, to the detriment of productivity.

Finally, the central parts of these clamps must occupy a significant space on the periphery of the elements into which they are inserted, and they can project radially beyond these, with the risk of becoming detached prematurely during the assembling operations and/or of significantly increasing the diametric space requirement of the assembly.

In French patent No. 79 17887 (published as No. 2.461.158) it was proposed, on the contrary, to make the axially-acting elastic means in one piece, whether these elastic means are in the form of lugs all extending axially to be hooked on the flanged edge of the drive element after, possibly, crossing the latter, or present in the form of lugs all extending radially so that each overlaps the flanged edge locally.

Although, by itself, such a disposition ensures in a simple fashion the radial retention of the lugs, because these lugs are made in one body with one of the two elements concerned, namely the drive element, they inevitably lead to a significant complication in manufacture.

It is a main object of the present invention to provide a device which overcomes these various disadvantages and results in a particularly satisfactory compromise between the various needs to be satisfied.

SUMMARY OF THE INVENTION

The invention provides a clutch release bearing of the kind comprising an operating element which is adapted to be subject to a control device, and a drive element which, either directly or indirectly, is under the control of axially-acting elastic means formed by a plurality of separate elastic clamps acting completely independently, and applied axially against the operating element, which drive element is adapted to act on the release device of a clutch, the said operating element carrying transversely, for the axial application of the drive element, a flange, and the said drive element itself carrying transversely, to co-operate axially with the said flange, a flanged edge, the release bearing being characterized in that each of the said elastic clamps has, on the one hand, a part which extends entirely axially, and, on the other hand, a part which extends entirely radially, one of which parts it applies axially to the operating element whilst the other bears axially on the drive element, at least said radial part being axially elastically deformable, and the said axial part extending across the flange of the operating element through an opening therein; and, to hold the elastic clamp radially with respect to the assembly, two axial channels are provided in the operating element, which channels are each disposed respectively on the two sides of the said opening, and with which the said axial part of said elastic clamp is at least locally engaged.

In addition to the fact that elastic clamps acting completely independently are provided, a suitable radial restraint of these elastic clamps is thus achieved in a very simple and effective way by the radial channels, and the arrangement advantageously requires a minimal diametric space, these elastic clamps being preferably placed in the internal periphery of the flange of the operating element, at the junction, in practice, between the flange and the sleeve of the operating element, when, (as is usual) such a flange is provided radially with a sleeve.

The elastic clamps according to the invention thereby free a space for the installation of the control device, even further space being provided by the lack of fastening between the elastic clamps.

Another advantageous result is the possibility of standardization, elastic clamps of the same type being capable of use in different types of declutching bearings.

Moreover, since the elastic force which they apply to the elements is provided entirely by the elastic clamps, the advantageous possibility arises of better control of this elastic force.

Finally, assembly is made relatively easy, mounting preferably being performed axially.

BRIEF DESCRIPTION OF THE DRAWINGS

FIG. 1 is a partial view in axial section of a clutch release bearing according to the invention;

FIG. 2 is a partial view in elevation of this release bearing along the arrow II in FIG. 1;

FIG. 3 is a partial view in perspective, seen from behind, of the operating element of this release bearing;

FIG. 4 is a perspective view of one of the elastic clamps of this release bearing;

FIG. 5 is a plan view, along the arrow V of FIG. 4, of this elastic clamp;

FIG. 6 is a partial perspective view corresponding to FIG. 3, illustrating embodiment of the operating element;

FIG. 7 is a partial view in plan corresponding to FIG. 5, illustrating a variant of the elastic clamp for the embodiment of the operating element shown in FIG. 6;

FIG. 8 is another partial view in perspective corresponding to FIG. 3, and concerns another variant of the operating element of the clutch release FIG. 9 is another partial view in plan corresponding to FIG. 5, and shows a of the elastic clamp for the embodiment of operating element in FIG. 8;

DESCRIPTION OF THE PREFERRED EMBODIMENTS

Figure 11:
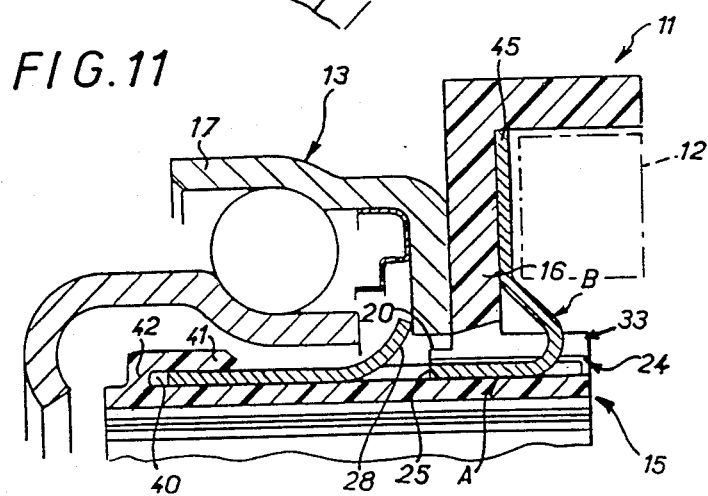
FIG. 11 is a partial view in axial section corresponding to FIG. 1, showing another embodiment of release bearing according to the invention.

Referring to the drawings, a release bearing 10 comprises an operating element 11, which is acted on by a control device which in practice is usually a clutch fork, (of which only one of the arms has been depicted in broken lines by the reference 12 in FIG. 11), and a drive element 13, which, either directly or indirectly, under the control of axially-acting elastic means to be described herein, is applied axially against the operating element 11, and which, under the action of the operating element is intended to act on the release device of a clutch (not shown) in known manner.

Also in known manner, the operating element 11 incorporates axially, for its engagement with a support or guidance device (not shown), a sleeve 15, and, transversely, for the axial application of the drive element 13, a flange 16, which in practice extends annularly around the sleeve 15, projecting from the external surface thereof.

The assembly is preferably moulded from synthetic material

In a manner which is also known, the drive element 13 consists of a ball bearing, one of the races of which is adapted to be supported axially on the operating element 11, whilst the other is adapted to act on the release device of the clutch.

In the embodiments shown, it is the external race 17 of this ball bearing which is adapted to be supported on the operating element 11, and, more exactly, against the flange 16 of the latter, this external race 17 itself carrying transversely, to engage the flange 16, a flanged edge 18 directed radially towards the axis of the assembly.

In the embodiments shown, it is the internal race 19 of the ball bearing which is adapted to act on the release device of the clutch.

In the embodiments shown, this internal race 19 has, for this purpose, a rounded profile at its free end.

In a variant, it can itself carry transversely, at its free end, a flanged edge directed radially in a direction away from the axis of the assembly.

In the embodiments shown, the axial support between the drive element 13 and the operating element 11 is made directly, by direct contact between the flanged edge 1B of the external race 17 of the ball bearing constituting the drive element 13 and the transverse flange 16 of the operating element 11.

In practice, with regard to a self-centering release bearing, and, more exactly, taking into account the elastic means used, to a self-centering and then remaining self-centred release bearing, an annular clearance is left between the section of the flanged edge 18 of the drive element 13 and a rib 20 projecting from the internal periphery of the flange 16 of the operating element 11, at the junction of this flange 16 and the sleeve 15 with which it is provided.

These arrangements are well known, and not being in themselves part of the present invention, will not be described in more detail here.

In an equally known manner, the axially-acting elastic means used to control the axial application of the drive element 13 to the operating element 11 are formed from a limited number of separate elastic clamps 22 detached completely from one another.

According to the invention, each of these elastic clamps 22 has, on the one hand, an entirely axial part A, that is to say a part which extends entirely axially, and, on the other hand, a radial part B, that is to say a part which extends entirely radially, one of which it applies axially to the operating element 11 whilst the other bears axially on the drive element 13; and the radial part B, at least, is elastically deformable axially, the said axial part A of the elastic clamp extending across the flange 16 of the operating element 11 through an opening 23 formed in it. In order to hold the elastic clamp radially with respect to the assembly, two axial channels 24 are provided in the operating element 11, which are each disposed respectively on the two sides of the opening 23 and with which the said axial part A of the elastic clamp is at least locally engaged.

In the embodiments shown, only two elastic clamps 22 are provided, in positions diametrically opposite one another, and each is made from a short piece of spring steel suitably cut and shaped.

In the embodiment shown in FIGS. 1 to 5, the axial part A of the elastic clamp 22 forms an essentially planar shoe, having, for reasons which will appear later, a cut 25 in its middle part; its radial part B, which is axially in alignment with axial part A, but is less wide than the latter, extends in continuity with part A, essentially in an S-shape, starting from a zone of origin in the axial part A which is slightly further back than the corresponding end of B.

Thus, in the embodiment shown in FIGS. 1 to 5, the axial part A forms two lugs 26 on both sides of the stem of radial part B.

At its other end, for reasons which will appear later, the axial part A has its angles reduced by chamfers 27.

Each elastic clamp 22 made in this way is applied by its radial part B to operating element 11, and, more exactly, to flange 16 of this operating element 11, on the side of this flange 16 away from the drive element 13, and, its axial part A extends across the said flange 16, through the opening 23 provided in it for this purpose, to come to bear on the other side of flange 16 and, more exactly, on the flanged edge 18 of drive element 13.

To bear in this way on the flanged edge 18, axial part A of elastic clamp 22 has a tongue 28, which, resulting from the cut 25 in this axial part A, projects from it on the same side as radial part B, and is elastically deformable, at least radially.

In practice, the openings 23 in operating element 11 extend to the internal periphery of its flange 16, that is to say to the junction of flange 16 and sleeve 15.

In the embodiment more particularly shown in FIGS. 1 to 5, the width L1 of opening 23, FIG. 3, is only slightly wider, in its main part, than the width L2 of tongue 28 of elastic clamp 22, FIG. 5, for passage of this tongue 28.

This width L1 is thus less, in this embodiment, than the width L3 of the axial part A of elastic clamp 22, FIG. 5, the engagement of this axial part A being made by means of axial channels 24 associated, according to the invention, with opening 23.

In the embodiment more particularly shown in FIGS. 1 to 5, these axial channels 24 are at the bottom of such an opening 23, each one opening circumferentially, that is to say tangentially, into it.

Thus in this embodiment, the wall of each axial channel 24 which is radially closest to the axis of the assembly is continuous with the corresponding wall 30, at the bottom of the respective opening 23.

In the embodiment shown, this bottom 30 is flat, like the axial part of elastic clamp 22, and it extends in a plane which, in its middle part, is essentially tangential to a circumference of the assembly, forming at the surface of sleeve 15, a boss 31.

Moreover, in the embodiment shown, the wall 32 of opening 23 opposite its base 30, or "roof", is at an oblique angle to the base 30, converging towards it in the direction of drive element 13.

The axial channels 24, whose respective bottoms are at a distance L4 from one another, FIGS. 2 and 3, slightly larger than width L3 of the axial part of an elastic clamp 22, are continuous both with flange 16 of operating element 11 and with the rib 20 on the internal periphery of the latter.

In the embodiment shown in FIGS. 1 to 5, these axial channels 24 are also prolonged beyond flange 16 of operating element 11 relative to drive element 13, by means of two bosses 33 which, radially projecting on sleeve 15 of operating element 11, on the internal periphery of its flange 16, extend axially from this flange 16 in the direction away from drive element 13, each flanking respectively the respective opening 23.

In practice, in this embodiment, these bosses 33 are at a distance L5 from one another, FIG. 3, greater than the width of the main part of opening 23 which they flank, and in contrast to boss 31, which itself extends right to the edge of sleeve 15, the bosses 33 stop at a distance from this edge.

Finally, in this embodiment, on their axial part situated on the same side as radial part B of elastic clamp 22, that is to say, in practice, on their axial end on the same side as the bosses 33, in the thicknesses of these, the bottoms of the axial channels 24 made according to the invention each have oblique short sections 34, converging towards one another in the direction of the flange 16 of operating element 11.

As will be understood, the axial channels 24 opening into the opening 23 with which they are associated, in this embodiment belong in some way to this opening 23.

Thus it is easy to understand that the production of operating element 11 from moulded synthetic material facilitates the formation of openings 23 and axial channels 24.

During assembly, drive element 13 is engaged axially on sleeve 15 of operating element 11, up to the contact of its flanged edge 18 with the transverse flange 16 of element 11.

Then, on the other side of this flange 16, the axial engagement of the elastic clamps 22 in the openings 23, which the transverse flange 16 carries for this purpose, proceeds, engaging the sides of axial parts A of these elastic clamps 22 in the axial channels 24 at the bottom of these openings.

This engagement is made easier both by the chamfers 27 cutting off the angles of the corresponding engaging end of this axial part A, and by the obliqueness of the initial section 34 at the bottoms of the axial channels 24.

During this engagement, tongue 28 of the elastic clamps 22 is put under constraint by the oblique "roof" 32 of the corresponding openings 23, the said tongue being thus deformed elastically in the direction of the axis of the assembly, whilst radial part B of the elastic clamp 22 becomes axially applied against flange 16 of operating element 11.

The axial engagement of the elastic clamp 22 is then continued until, passing beyond the flanged edge 18 of drive element 13, the tongue 28 of axial part A, thus freed, retakes its initial configuration and so comes to bear on this flanged edge 18 on its side away from flange 16.

The assembly consisting of flange 16 of operating element 11 and flanged edge 18 of drive element 13 is then pressed elastically between, on the one hand, tongue 28 of axial part A of the elastic clamp 22, and, on the other hand, radial part B, which ensures both good elastic control of the corresponding axial application and the necessary axial location of the drive element 13 and the operating element 11.

In the variant shown in FIGS. 6 and 7, the distance L'5 separating the bosses 33 of operating element 11 is slightly greater than the width L3 of the axial part of elastic clamps 22, so that the main part, at least, of axial channels 24 flanking at its base the opening 23 corresponding to this operating element 11 affects only rib 20 and flange 16 of the element without being prolonged into the said bosses 33.

In alignment with these channels 24, these bosses 33 have, however, at their bases, on the side away from flange 16, a suitable chamfer 34', to facilitate the axial engagement of the elastic clamps 22.

In practice, and according to arrangements corresponding to those described previously, the chamfers 34' thus associated with the axial channels 24 converge towards one another in the direction of flange 16 of operating element 11.

In addition, in this embodiment, FIG. 7, radial part B of elastic clamps 22 is just as wide as axial part A.

In this embodiment, therefore the elastic clamps 22 do not have lugs 26 on both sides of their radial part B.

In the embodiment shown in FIGS. 8 and 9, the elastic clamps 22 again have lugs 26 on both sides of their radial part B, at the origin of the radial part B, this part B being less wide than the axial part A with which it is associated, but, to cooperate with the corresponding axial channels 24 of operating element 11, described later, these lugs 26 each have a circumferential prolongation 36 extending in opposite circumferential directions to on another.

In practice, these circumferential prolongations 36 thus formed on each of the elastic clamps 22 extend tangentially, in the same plane, which is the plane of the shoe formed by their axial part A.

Furthermore, the axial channels 24, each formed between two elements described later, projecting axially on flange 16 of operating element 11, no longer belong, as previously, to opening 23 with which they are associated but, on the contrary, are shifted axially in relation to this opening 23 they are independent of it.

In practice, for both axial channels 24, one of these elements is formed by sleeve 15 of operating element 11, (more precisely, by boss 31) which extends tangentially to sleeve 15, level with the bottom 30 of the opening 23 concerned, this boss 31 then reaching amply laterally on both sides of the opening.

With each of the axial channels 24, the other element is a stub 38, which, projecting axially from flange 16, extends parallel to boss 31 mentioned previously, at a distance from it.

Thus, in this embodiment, channels 24 are formed between, on the one hand, a tangential boss 31 of sleeve 15 of operating element 11, and, on the other hand, two stubs 38 each disposed respectively on one side or the other of the respective opening 23 of flange 16, and it is through the circumferential prolongations 36 of their axial part A that the elastic clamps 22 are adapted to engage with axial channels 24.

Figure 10:
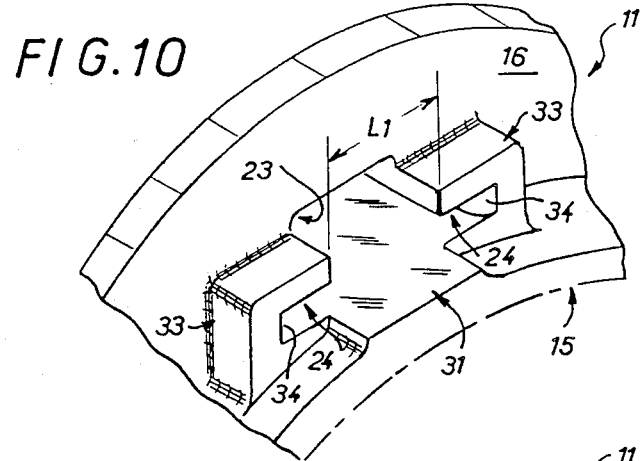
FIG. 10 is another partial view in perspective corresponding to FIG. 3, and shows another variant of the operating element of the release bearing according to the invention.

In the embodiment shown in FIG. 10, operating element 11 has, as in the embodiments shown in FIGS. 1 to 7, bosses 33, but these are spread at a distance from one another equal to the width L1 of the opening 23 which they flank.

Thus, these bosses 33 extend level with the transverse walls of opening 23.

Figure 12:
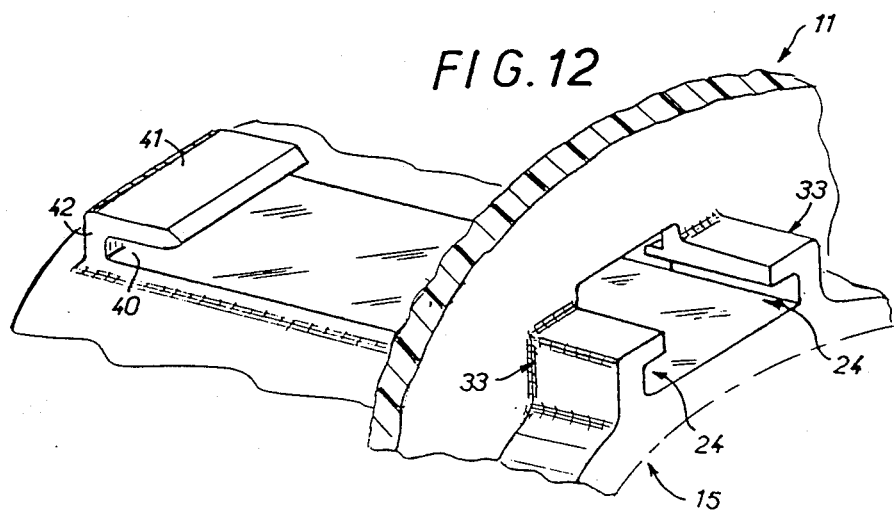
FIG. 12 is a partial view in perspective, seen from behind, of the operating element used in embodiment of FIG. 11.

It is the same in the embodiment shown in FIGS. 11 and 12, in which, however, these bosses 33 extend along the whole length of sleeve 15 of operating element 11, on the side of the flange of this away from the drive element 13, and taking, externally, the shape of the corresponding axial channels 24.

In addition, in this embodiment, at the other end of sleeve 15 of operating element 11, that is to say at its end on the same side of its flange 16 as the drive element 13, a gap 40 is provided in alignment with each opening 23, into which the appropriate end of the axial part A of the corresponding elastic clamp 22 is inserted to hold it radially.

In practice, in this embodiment, this gap 40 is made between the sleeve 15 of operating element 11 and a foot 41 which comes from sleeve 15 through a right-angled return piece 42, and extends parallel to the sleeve towards flange 16.

Preferably, as shown, to facilitate the insertion of the end of axial part A of an elastic clamp in the gap thus formed, the free end of the foot 41 defining this gap 40 is chamfered.

Finally, in this embodiment, the radial part B of each elastic clamp 22 is prolonged radially, away from the axis of the assembly, by a leg 45 adapted to form an anti-wear plate for the corresponding arm 12 of this of the associated control device.

In the embodiment shown, the bottoms of the channels 24 are straight throughout their length, but, as before, they could equally have an oblique short section at their end away from drive element 13.

The present invention is not limited to the embodiments described and shown, but includes all variants and/or combination of their different elements within the scope of the appended claims.

In particular, although in the embodiments more particularly described and shown axial engagement of the elastic clamps 22 is made on the side of flange 16 of operating element 11 away from drive element 13, this axial engagement can equally well be made, at least in certain applications, on the same side as this drive element.

In this case, the elastic clamps 22 are applied axially by their radial part B to the flanged edge 18 of drive element 13 and, through their axial part A they bear axially on flange 16 of operating element 11, on the opposite side of this flange after passing through it.

In addition, the shoe portion of the elastic clamp is not necessarily planar; on the contrary it could for example equally well be curved, for example to match the curvature of the sleeve of the operating element.

What is claimed is:

1. A clutch release bearing of the kind comprising an operating element adapted to be acted on by a control device, and a drive element adapted to act on the release device of a clutch connected to the operating element by axially-acting elastic means formed by a plurality of separate elastic clamps operable to apply said drive element axially against said operating element, said operating element being provided transversely, for the axial application of the drive element, with a flange, and said drive element itself carrying transversely a flanged edge co-operating axially with said flange, wherein each of the said elastic clamps comprises an axial part applied axially to the drive element and a radial part elastically deformable and applied axially to the operating element, said axial part has a radially elastically deformable tongue extending towards said radial part with which the tongue cooperates to clamp said drive element axially against said operating element, said axial part extending across said flange through an opening therein, and two axial channels being provided in said operating element to locate said elastic clamp radially with respect to the assembly, said channels being disposed respectively on two sides of said opening in said operating element, and said axial part of the respective elastic clamp being at least locally engaged therewith.

2. A clutch release bearing as claimed in claim 1, wherein said axial channels form part of the opening with which they are associated.

3. A clutch release bearing as claimed in claim 2, wherein said axial channels are at the bottom of the opening with which they are associated, and each opens circumferentially into it.

4. A clutch release bearing as claimed in claim 2, wherein said axial channels are prolonged axially beyond the flange of said operating element by means of two bosses each respectively flanking the opening with which they are associated.

5. A clutch release bearing as claimed in claim 2, wherein at their axial end towards the radial part of the respective elastic clamp, the bottoms of said axial channels each have oblique short sections converging towards one another in the direction of the flange of said operating element.

6. A clutch release bearing as claimed in claim 2, wherein grooves converging towards one another in the direction of the flange of said operating element are associated with said axial channels.

7. A clutch release bearing as claimed in claim 1 wherein said axial channels are formed between two elements projecting axially from the flange of said operating element, are independent of the opening in said flange and are spaced axially from said opening.

8. A clutch release bearing as claimed in claim 7, wherein the operating element has an axial sleeve on its external surface from which said flange projects radially, and said elements comprise, for each axial channel on the one hand, said sleeve and, on the other hand, a stub projecting from the said flange.

9. A clutch release bearing as claimed in claim 1, wherein each said elastic clamp is formed from a short piece of spring steel suitably cut and shaped, and the tongue of its axial part is formed from a cut therein.

10. A clutch release bearing as claimed in claim 9, wherein said axial part of said elastic clamp forms two lugs, each disposed respectively on one or the other side of the radial part with which it is associated.

11. A clutch release bearing as claimed in claim 10, wherein for co-operation with the corresponding axial channels of the operating element, the lugs each have a circumferential prolongation extending in opposite circumferential directions.

12. A clutch release bearing as claimed in claim 9, wherein said axial part of said elastic clamp forms an essentially planar shoe.

13. A clutch release bearing as claimed in claim 1, wherein each elastic clamp is applied by its radial part to the operating element and its axial part bears on the drive element.

14. A clutch release bearing claim 13, wherein said radial part of each elastic clamp is prolonged radially by a leg adaptable to form an anti-wear plate for the control device.

15. A clutch release bearing as claimed in claim 14, wherein each elastic clamp is applied by its radial part to the flange of the operating element, on its side away from the drive element and, on the outer side of said flange its axial part bears on the flanged edge of said drive element.

16. A clutch release bearing as claimed in claim 1, wherein only two elastic clamps are provided, in positions diametrically opposite one another.

17. A clutch release bearing as claimed in claim 1, wherein said operating element has an axial sleeve on its external surface from which said flange projects radially, and on the same side of the flange as the drive element a recess is provided, in alignment with each said opening of the flange into which the axial part of the corresponding elastic clamp is received.

* * * * *